Oct. 4, 1955  O. SCHILLING  2,719,514
PRECHAMBER COMPRESSION IGNITION ENGINE
Filed Aug. 10, 1950
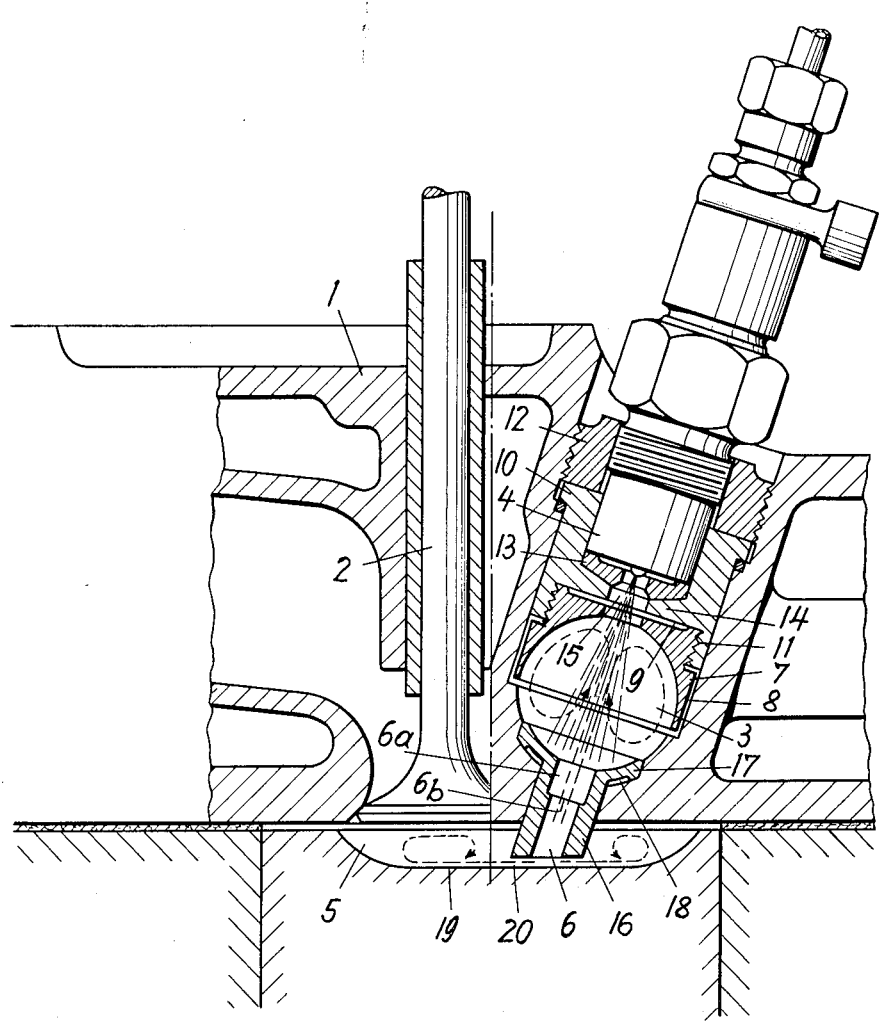
INVENTOR
OTTO SCHILLING
BY Dicke and Padlon.
ATTORNEYS United States Patent Office 2,719,514
Patented Oct. 4, 1955

2,719,514

PRECHAMBER COMPRESSION IGNITION ENGINE

Otto Schilling, Stuttgart-Unterturkheim, Germany, assignor to Daimler-Benz Aktiengesellschaft, Stuttgart-Unterturkheim, Germany Application August 10, 1950, Serial No. 178,607
In Germany October 1, 1948

Public Law 619, August 23, 1954
Patent expires October 1, 1968

12 Claims. (Cl. 123—32)

This invention relates to prechamber compression ignition engines having a restricted passageway between the prechamber and main combustion chamber.

One of the objects of the invention is to provide an improved starting of the engine, even at low temperatures of the external atmosphere and an improved operation of the engine, particularly at a lower speed range and above all for the purpose of eliminating the so-called knocking or hammering of the engine.

Another object of the invention is to improve the heat exchange condition of the engine particularly in the prechamber.

A further object of the invention is to render the engine and its component parts, particularly the injection nozzle, more insensitive to the high temperatures in the prechamber and to screen the same from these high temperatures.

Further objects of the invention substantially consist in providing for a thorough mixing of fuel and air in the prechamber and in the main combustion chamber, a convenient arrangement and construction of inserts, prechamber and other parts of the engine.

A main feature of the invention accordingly consists in an insert lining the prechamber at the side opposite the passageway and serving as a baffle wall for the air entering from the main combustion chamber, said lining being conveniently arranged so as to avoid direct contact with the injection nozzle injecting the fuel through an aperture in the insert into the prechamber.

The advantages obtained thereby are above all the following: Starting of the engine is greatly facilitated in that the air surrounding the fuel jet, even after prolonged standstill of the engine, is very quickly heated up to high temperatures owing to the compression when cranking, thereby initiating correspondingly speedily a first ignition in the prechamber. In this case a spark plug may be omitted. The so-called knocking of the engine occurring particularly in starting and with the engine cold will be prevented and the combustion will be smoother and the warming up of the engine will be more quickly completed so that the knocking will cease sooner. Though the engine will deliver the same performance, the fuel consumption will be also reduced while the engine is in operation, the efficiency will be accordingly increased, as the ratio of the only indirectly cooled surface of the combustion chamber to the total combustion chamber surface will be higher, i. e., more favorable, and thus the heat loss to the cooling water diminished. A particular timing of the injection may ultimately be omitted as owing to higher temperatures in the prechamber the ignition lag will be decreased and the combustion process will develop more accurately.

By interposing an intermediate member preferably of plastic material of high thermal conductivity between nozzle and insert, for instance by suitably arranging a sleeve member holding the injection nozzle there may be further obtained an efficient protection of the nozzle from the high temperatures of the prechamber and of the needle of the injector nozzle.

Another feature of the invention relates to an insert lining the passageway, further to the provision of an enlargement in the passageway prior to its transition into the prechamber, said enlargement being conveniently recessed so as to form a sharp edge with the unenlarged part of the passageway. In this way it will be noted that the compressed air forced into the prechamber will remain in contact with the wall of the passageway as long as is necessary to guide the air, whereupon it is separated from that wall. Consequently only a small amount of heat is transferred to the wall and to the insert respectively. Simultaneously the friction loss of the air passing through the passageway is reduced.

According to another feature of the invention, a favorable influence on the heat retention of the engine may be obtained by designing the main combustion chamber substantially as a recess in the piston head. The hot compressed air in the main combustion chamber is thus screened against the cooled cylinder bore. Further the construction according to the present invention will ultimately prevent that fuel particles, while still liquid, are deposited on the cylinder bore thereby forming residues.

Owing to the efficient insulation of prechamber and passageway by the lining inserts which conveniently comprise also that tray or funnel shaped portion of the prechamber adjacent the enlargement and opposite the injection nozzle, and because of the arrangement of the main combustion chamber in a piston recess, the fuel jet will come in contact only with hot air over its entire passage through the prechamber, until ignition and even combustion thereof takes place in the main combustion chamber, which hot air is permitted to remain at an elevated temperature because of the particular insulating arrangement, a fact which contributes in a most favorable manner to an improved operating efficiency of the engine.

A further step-up in performance can be attained according to another feature of the invention in that the top center of the piston closely approaches, the discharge and the passageway thereby forming an annular choking gap through which blowing out under high pressure and a uniform distribution of the fuel and of the prechamber contents respectively takes place. On the other hand, however, it is assured thereby that with the piston in a lower position, a comparatively unchoked and undisturbed introduction of the air into the prechamber can take place.

One form of embodiment of invention is illustrated in the accompanying drawing which is a section through the cylinder head of a prechamber compression ignition engine such as used for motor vehicles.

In a water cooled cylinder head 1 one inlet and one exhaust valve 2 are arranged one adjacent the other, for instance, symmetrically with respect to the plane of the drawing sheet, i. e., with respect to a section through the cylinder axis. Opposite these valves in an inclined bore of the cylinder head there is a prechamber 3 which on the one hand is supplied with fuel from an injection nozzle 4 and on the other is connected through a passageway 6 arranged slantingly and offset from the cylinder axis with the main combustion chamber 5 substantially being constituted by a recess in the piston head.

As illustrated in the drawing, there is provided a spherical prechamber so that the air forced into the prechamber during the compression stroke through the passageway 6 in direction towards the injection nozzle will be deflected in the vicinity of the injection nozzle in a radial direction thereby creating a roll type swirling motion. That wall portion of the prechamber which in this case serves as a baffle wall for the air consists according to the invention of a tray-shaped lining 7 insulated from the cooled cylinder head wall by means of a cylindrical insulating gap 8 and by a disk-like insulating gap 9 against a sleeve 10 inserted into the cylinder head bore and connected therewith by a thread 11. The sleeve 10 is held in the cylinder head by a nut 12 into which the injection nozzle is screwed in, said sleeve concentrically surrounding the injection nozzle serves together with a collar 14 screening the nozzle from the prechamber and the lining 7 respectively to secure the injection nozzle against axial dislocation, a heat dissipating copper disk 13 being interposed between collar 14 and injection nozzle 4. The fuel is injected through a central port 15 into the inflowing air deflected at the lining 7 and ignited during operation in the vicinity of the opposite wall of the prechamber. This wall and that of the passageway 6 is formed by a lining 16 being enlarged in the direction of the prechamber and the fuel jet respectively in conformity with the spherical shape of the prechamber so as to form a tray 17 which is insulated from the cylinder head wall by an insulating space 18.

The passageway 6 formed by the lining or insert 16 has an enlargement 6a at its upper end adjacent the prechamber, said enlargement 6a forming a sharp edge 6b with the unenlarged regularly cylindrical lower portion of the passageway. The length of the unenlarged portion of the passageway 6 appropriately should not be longer than is necessary, for example, one or two times its diameter, to obtain a directed air flow owing to its being guided therein, whilst the enlargement 6a conveniently has an inside diameter, for example, about one and a half times the passageway diameter in the unenlarged, such that the air stream separating at the edge 6b will reach and pass through the prechamber substantially without getting into contact with the wall of the enlargement thus avoiding heat and friction losses.

The lining 16 projects beyond the under side of the cylinder head, e. g., as far as possible into the main combustion chamber and in such a manner that in the top center a narrow annular gap 20 is formed between the lower end face of the lining and the piston head 19, distributing after the prechamber ignition the blowing out contents thereof radially and uniformly over the main combustion chamber 5 which is screened from the cylinder walls. The arrangement as described in the foregoing together with the smooth and slightly lagging prechamber ignition owing to the favorable thermal conditions in the prechamber will result in a particularly smooth, and highly perfect efficient combustion and provides a smokeless operation throughout the entire speed range of the engine.

If desired, the prechamber may also be equipped with a hollow spherical liner consisting of one or a plurality of parts and insulated from the wall, said liner being supported at one or more points, for instance, concentrically with the passageway, e. g., the funnel 17 of the drawing.

This invention is by no means limited to the example of construction illustrated and may find application in its principle also to other engines with subdivided precombustion chamber notwithstanding it involves particular advantages for prechamber compression ignition engines of the kind described.

What I claim is:

1. In a compression ignition engine, a main combustion chamber, a prechamber, a restricted passageway between said chambers, an injection nozzle with a frontal area located substantially opposite said passageway, said passageway and injection nozzle being arranged substantially coaxially with respect to each other with the axis thereof extending approximately through the center point of said prechamber, a tray-shaped insert member in said prechamber delimiting said prechamber only in the direction towards said injection nozzle, said tray-shaped insert member being partially spherically-shaped and disposed substantially concentrically with respect to the axis of said injection nozzle and being located between said injection nozzle and said prechamber opposite said passageway without direct contact with said injection nozzle, a substantially disk-shaped insulating gap being provided between said insert member and the frontal area of said injection nozzle containing the nozzle opening, said insert being provided with an aperture for the passage of the fuel injected by said nozzle having a diameter substantially smaller than the diameter of said frontal area to thereby effectively constitute a baffle wall for the air introduced through said restricted passageway.

2. In a compression ignition engine with an engine casing, a main combustion chamber, an engine prechamber, and a restricted passageway between said main combustion chamber and said prechamber with the axis thereof extending substantially through said prechamber, an injection nozzle with a frontal area containing the nozzle opening for injecting fuel substantially in the direction of said axis, a sleeve member inserted into said engine casing and surrounding said injection nozzle, a tray-shaped insert member in said prechamber opposite said passageway and located anterior of said sleeve member and said nozzle, said tray-shaped insert member constituting a baffle wall for the air introduced through said passageway and being provided with an aperture for the passage of the fuel injected through said nozzle, said aperture having a diameter substantially smaller than the diameter of said frontal area, an annular intermediate member screening said frontal area in the direction of said prechamber and located between said nozzle and said sleeve member, a substantially disk-shaped insulating gap being provided between said insert member and said frontal area of said injection nozzle containing the nozzle opening.

3. In a compression ignition engine, an engine casing, a main combustion chamber in said casing, a prechamber, and a passageway between said main combustion chamber and said prechamber, an injection nozzle with a frontal area containing the nozzle opening for injecting fuel into said prechamber, said passageway and said injection nozzle being substantially coaxial with respect to each other with the axis thereof extending approximately through the center point of said prechamber, an annular intermediate member screening said frontal area of the injection nozzle in the direction of said prechamber, a sleeve member having an inwardly projecting collar-shaped member with a surface each directed towards said nozzle and said prechamber, said sleeve member surrounding said injection nozzle and said intermediate member, said intermediate member, on the one hand, being spaced from said frontal area by an insulating gap extending over a substantial part thereof and, on the other hand, resting against the surface of said collar-shaped member directed towards said nozzle, a tray-shaped insert member screening said nozzle, said intermediate member, and said sleeve member from said prechamber, said tray-shaped insert member delimiting the portion of said prechamber facing said injection nozzle and being provided with an aperture for the passage of fuel injected by said nozzle, said tray-shaped insert member abutting against the surface of said collar-shaped member directed towards said prechamber and being separated therefrom to a considerable extent by a disk-shaped gap.

4. In a compression ignition engine the combination according to claim 2, wherein said tray-shaped insert member is threadably connected with said sleeve member, said insert member being insulated from the surrounding casing by an annular insulating gap, wherein said sleeve member includes a collar-like inward projection between said intermediate member and said tray-shaped member, and wherein said tray-shaped member is further insulated against said inward projection by a substantially disk-like insulating gap.

5. In a compression ignition engine, the combination as defined in claim 1, further comprising a second insert member containing said passageway, said second insert member being partially spherically shaped and delimiting the portion of said prechamber adjacent said passageway, said insert members forming a substantially spherical prechamber.

6. In a compression ignition engine as defined in claim 1, further comprising a second insert member containing said passageway, said passageway being provided with an enlargement adjacent said prechamber and providing a sharp edge with the unenlarged portion of said passageway.

7. In a compression ignition engine the combination according to claim 6, wherein said second insert member delimits the portion of said prechamber adjacent said passageway.

8. In a compression ignition engine comprising a main combustion chamber, a prechamber, a restricted passageway between said chambers, a reciprocating engine piston delimiting said main combustion chamber, an injection nozzle with a frontal area located substantially opposite said passageway, said passageway and said injection nozzle being arranged substantially coaxial with respect to each other with the axis thereof extending approximately through the center point of said prechamber, a tray-shaped insert member in said prechamber delimiting said prechamber in the direction towards said injection nozzle, said tray-shaped insert member being partially spherically shaped and disposed substantially concentrically with respect to the axis of said injection nozzle and being located between said injection nozzle and said prechamber opposite said passageway, a substantially disk-shaped insulating gap being provided between said insert member and the frontal area of said injection nozzle containing the nozzle opening, said insert member being provided with an aperture for the passage of fuel injected by said nozzle having a diameter substantially smaller than the diameter of said frontal area to thereby effectively constitute a baffle wall for the air introduced through said restricted passageway, a second insert member containing said passageway, said passageway being provided with an enlargement adjacent said prechamber and providing a sharp edge with the unenlarged portion of said passageway, said piston approaching in the top dead-center position thereof said second insert member so closely that a narrow annular gap is formed between said piston and said second insert member.

9. In a compression ignition engine, an engine cylinder, a piston reciprocating therein, a recess in the piston head substantially constituting the main combustion chamber, a cylinder head, a prechamber in said cylinder disposed eccentrically with respect to the cylinder head, a passageway between the prechamber and main combustion chamber, an injection nozzle injecting fuel into the prechamber in the direction of said passageway, an insert member in the prechamber at the side thereof opposite the passageway, and a second insert member containing said passageway and provided with an enlargement adjacent said prechamber in the direction of injection through said passageway, said enlargement forming a sharp edge with the unenlarged remainder of said passageway, said first insert member being insulated over a large portion thereof from the surrounding wall by an insulating gap annularly surrounding said insert member, and two valves in the cylinder head located adjacent the prechamber, said recess in the piston head being arranged offset from the cylinder axis, the axes of the prechamber and of the passageway extending slantingly with respect to the cylinder axis and the passageway discharging eccentrically into the recess of the piston head, said first-mentioned insert member including a portion shielding the side of said injection nozzle adjacent said prechamber against the hot gases in said prechamber.

10. In a pre-combustion chamber of an injection type internal combustion engine having an injection nozzle with a frontal area containing the nozzle opening and a restricted communicating passage opposite said nozzle, a tray-shaped insert member arranged concentrically to said injection nozzle, said insert member delimiting said pre-combustion chamber only at the side thereof opposite said communicating passage and being provided with an opening of smaller diametric dimension than said frontal area for the passage of fuel injected through said nozzle opening, thread means for fastening said tray-shaped insert member in the surrounding engine wall to provide a substantially disk-shaped insulating gap for insulating said tray-shaped insert member at the surface thereof turned away from said pre-combustion chamber and adjacent said nozzle opening and to provide a substantially cylindrical gap for insulating said insert member from said surrounding wall, said thread means being located between said two insulating gaps.

11. In an injection internal combustion engine, according to claim 10, further comprising another insert member containing said communicating passage, said last-mentioned insert member having a tray-shaped flange part opened towards said pre-combustion chamber, said two tray-shaped insert members lying opposite each other and being shaped in the form of a partial sphere with substantially a common center point so that together they form a substantially spherical pre-combustion chamber.

12. In an engine according to claim 11 wherein there is provided a zone between said two insert members in which the pre-combustion chamber is formed directly by the surrounding cylinder head wall, said cylindrical gap being connected through said zone with the inside of the pre-combustion chamber.

References Cited in the file of this patent

UNITED STATES PATENTS

| | | |
|---|---|---|
| 2,019,298 | Fischer | Oct. 29, 1935 |
| 2,065,025 | Ricardo | Dec. 22, 1936 |
| 2,080,189 | Schwaiger | May 11, 1937 |
| 2,148,505 | Rosen | Feb. 28, 1939 |
| 2,201,220 | Bokemuller et al. | May 21, 1940 |
| 2,402,213 | Starr | June 18, 1946 |
| 2,619,078 | Witzky et al. | Nov. 25, 1952 |

FOREIGN PATENTS

| | | |
|---|---|---|
| 713,425 | France | Oct. 27, 1931 |
| 424,417 | Great Britain | Feb. 11, 1935 |
| 848,491 | France | July 24, 1939 |
| 697,200 | Germany | Oct. 8, 1940 |

OTHER REFERENCES

Ser. No. 368,293, Von Mallinckrodt (A. P. C.), published May 11, 1943.